(12) United States Patent
Li et al.

(10) Patent No.: US 7,127,610 B1
(45) Date of Patent: Oct. 24, 2006

(54) APPARATUS AND METHOD OF IMPLEMENTING MULTICAST SECURITY BETWEEN MULTICAST DOMAINS

(75) Inventors: Yunzhou Li, Lowell, MA (US); Billy C. Ng, Revere, MA (US); Jyothi Hayes, Harvard, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/474,203

(22) Filed: Dec. 29, 1999

Related U.S. Application Data (60) Provisional application No. 60/137,235, filed on Jun. 2, 1999.

(51) Int. Cl.
 *H04L 9/00* (2006.01)

(52) U.S. Cl. .......................... 713/163; 709/201; 726/2

(58) Field of Classification Search ........ 713/200–201, 713/163–165, 151–152, 170, 171; 380/21, 380/33, 277–279, 281–285, 45, 29–30; 726/2–5, 726/21, 27, 30; 709/105, 107, 200–201, 709/223–225
See application file for complete search history.

(56) References Cited

U.S. PATENT DOCUMENTS

| | | | |
|---|---|---|---|
| 5,719,938 A * | 2/1998 | Haas et al. ................... 705/52 |
| 5,748,736 A * | 5/1998 | Mittra ........................ 713/163 |
| 6,049,878 A * | 4/2000 | Caronni et al. ............. 713/201 |
| 6,330,671 B1 * | 12/2001 | Aziz ........................... 713/163 |
| 6,331,983 B1 * | 12/2001 | Haggerty et al. ........... 370/400 |
| 6,389,532 B1 * | 5/2002 | Gupta et al. ................ 713/163 |
| 6,556,835 B1 * | 4/2003 | Raivisto ..................... 455/466 |
| 6,584,566 B1 * | 6/2003 | Hardjono ................... 713/163 |
| 6,587,943 B1 * | 7/2003 | Hardjono ................... 713/163 |
| 6,606,706 B1 * | 8/2003 | Li .............................. 713/162 |
| 6,650,753 B1 * | 11/2003 | Lotspiech et al. .......... 380/277 |
| 6,810,259 B1 * | 10/2004 | Zhang ....................... 455/456.5 |
| 6,901,510 B1 * | 5/2005 | Srivastava .................. 713/163 |

OTHER PUBLICATIONS

Conover, Joel: Minding your virtual Ps and Qs. Oct. 15, 1997; Network Computing, CMP Publications, Inc.; vol. 8, Iss. 19 p. 176 (2 pgs).*

The Microsoft Computer Dictionary; Microsoft Press, 5th Edition, p. 192.*

Bates et al., "RFC 2283: Multi Protocol Extensions for BGP-4", The Internet Engineering Task Force [www.ietf.org], Request for Comments, Feb. 1998.

(Continued)

*Primary Examiner*—Hosuk Song
*Assistant Examiner*—Leynna T. Ha
(74) *Attorney, Agent, or Firm*—McGuinness & Manaras LLP (57) ABSTRACT

An apparatus and method of implementing multicast security in a given multicast domain, the given multicast domain having one or more network devices, receives multicast traffic that is encrypted with a global key, the global key being available to the given multicast domain and one or more other multicast domains, decrypts the received multicast traffic with the global key to produce decrypted multicast traffic, encrypts the decrypted multicast traffic with a local key to produce local encrypted multicast traffic, the local key being available to the given multicast domain, and forwards the local encrypted multicast traffic to the one or more network devices in the given multicast domain. In a further embodiment, the apparatus and method for implementing multicast security in a given multicast domain first receives a global key message that identifies the global key.

44 Claims, 8 Drawing Sheets

OTHER PUBLICATIONS

Canetti, et al., "A taxonomy of multicast security issues", The Internet Engineering Task Force [www.ietf.org], Internet-Draft, May 1998.

Deering, et al., "Protocol Independent Multicast Version 2, Dense Mode Specification", The Internet Engineering Task Force [www.ietf.org], Internet-Draft May 21, 1997.

Estrin, et al., "RFC 2362: Protocol Independant Multicast-Sparse Mode (PIM-SM): Protocol Specification", The Internet Engineering Task Force [www.ietf.org], Request for Comments, Jun. 1998.

Farinacci, et al., "Multicast Source Discovery protocol (MSDP)", The Internet Engineering Task Force [www.ietf.org], Internet-Draft, Mar. 11, 1999.

Hanks, et al., RCF 1701: Generic Routing Encapsulation (GRE), The Internet Engineering Task Force [www.ietf.org], Request for Comments, Oct. 1994.

Harkins, et al., "The Internet Key Exchange (IKE)", The Internet Engineering Task Force [www.ietf.org], Internet-Draft, May 1999.

Kent, et al., "RFC 2401: Security Architecture for the Internet Protocol", The Internet Engineering Task Force [www.ietf.org], Request for Comments, Nov. 1998.

Li, "Group Specific MSDP Peering", The Internet Engineering Task Force [www.ietf.org], Internet-Draft, Jun. 4, 1999.

Li, et al., "Transitional Secure Multicast Plane between PIM-SM Domains (SMPP)", The Internet Engineering Task Force [www.ietf.org], Internet-Draft, Jun. 10, 1999.

Mittra, "Iolus: A Framework for Scalabe Secure Multi casting", Proceeding of the ACM SIGCOMM '97, Sep. 14-18, 1997, Cannes, France.

Pusateri, "Distance Vector Multicast Routing Protocol", The Internet Engineering Task Force [www.ietf.org], Internet-Draft, Aug. 31, 1999.

Thaler, "Border Gateway Multicast Protocol (BGMP): Protocol Specification", The Internet Engineering Task Force [www.ietf.org], Internet-Draft, Mar. 12, 1998.

* cited by examiner

APPARATUS AND METHOD OF IMPLEMENTING MULTICAST SECURITY BETWEEN MULTICAST DOMAINS

PRIORITY

This application claims priority from co-pending provisional U.S. Patent Application Ser. No. 60/137,235, filed Jun. 2, 1999, entitled "APPARATUS AND METHOD OF BRIDGING MULTICAST SECURITY BETWEEN MULTICAST DOMAINS", the disclosure of which is incorporated herein, in its entirety, by reference.

CROSS REFERENCE TO RELATED APPLICATIONS

This application is related to U.S. patent application Ser. No. 09/474,477 filed on even date herewith, entitled "APPARATUS AND METHOD OF MINIMIZING INTERNAL MULTICAST TRAFFIC", naming Yunzhou Li as inventor, the disclosure of which is incorporated herein, in its entirety, by reference.

FIELD OF THE INVENTION

The invention generally relates to networks and, more particularly, the invention relates to multicast transmissions across a computer network.

BACKGROUND OF THE INVENTION

Multicasting is a well-known method of transmitting information to selected groups of users across a network, such as the Internet. For example, the transmission of an E-mail message to a group of users, each user being listed on a mailing list, uses multicasting principles. Video conferencing and teleconferencing also use multicasting principles and, accordingly, are often referred to as "multiconferencing."

Due to increased demand for uses utilizing multicasting principles, protocols such as the Internet Group Multicast Protocol ("IGMP") have been developed and refined to support multicasting over a Transmission Control Protocol/Internet Protocol ("TCP/IP") network, such as the Internet. The new protocols, such as IGMP, allow users to easily create and join multicasting sessions ("multicasts"). However, multicasts often transmit confidential information between multicast users ("members") during the multicast. Thus, a need exists for securing multicast transmissions.

However, because multicasting involves groups of users, securing multicast transmissions raises the issue of scalability. In response to this issue, it is recognized that it would be more scalable to allow the use of multiple, independently group security associations. In one such scheme, each packet is decrypted, and then re-encrypted, subgroup to subgroup, until the packet reaches the destination member. However, as a result of the decryption and re-encryption from subgroup to subgroup, the multicast transmission incurs latency. In addition, a problem arises when a multicast transmission is sent from a data originator that only allows an authorized agent or broker to translate the multicast transmission.

In another scheme, a multicast network is partitioned into hierarchical multiple security domains. In this scheme, however, a multicast transmission cannot be translated across horizontal domains.

SUMMARY OF THE INVENTION

In accordance with one aspect of the invention, an apparatus and method of implementing multicast security in a given multicast domain, the given multicast domain having one or more network devices, receives multicast traffic that is encrypted with a global key, the global key being available to the given multicast domain and one or more other multicast domains, decrypts the received multicast traffic with the global key to produce decrypted multicast traffic, encrypts the decrypted multicast traffic with a local key to produce local encrypted multicast traffic, the local key being available to the given multicast domain, and forwards the local encrypted multicast traffic to the one or more network devices in the given multicast domain. In a further embodiment, the apparatus and method of implementing multicast security in a given multicast domain first receives a global key message that identifies the global key.

In an alternate embodiment of the invention, the local encrypted multicast traffic is forwarded to all of the network devices in the given multicast domain. In a further alternate embodiment of the invention, the local encrypted multicast traffic is forwarded to a subset of the network devices in the given multicast domain, the subset of network devices being identified in a multicast message. In a still further alternate embodiment of the invention, the local key is only available to the given multicast domain.

In accordance with another aspect of the invention, a method of implementing multicast security in a given multicast domain receives multicast traffic that is encrypted with a global key, the global key being available to the given multicast domain and one or more other multicast domains, determines that the given multicast domain contains no network devices interested in the received multicast traffic, and sends a terminate message to no longer forward the received multicast traffic to the given multicast domain. In a further embodiment of the invention, the method of implementing multicast security in a given multicast domain first receives a global key message that identifies the global key.

In a still further embodiment of the invention, the method of implementing multicast security in a given multicast domain determines, after having sent the terminate message, that the given multicast domain contains one or more network devices interested in the received multicast traffic and sends a resume message to once again forward the received multicast traffic to the given multicast domain.

In accordance with a further aspect of the invention, an apparatus and method of implementing multicast security in a network encrypts multicast traffic with a global key, the global key being available to a given multicast domain and one or more other multicast domains, forwards the global encrypted multicast traffic to the given multicast domain, receives the global encrypted multicast traffic at the given multicast domain, decrypts at the given multicast domain the global encrypted multicast traffic with the global key to produce decrypted multicast traffic, encrypts at the given multicast domain the decrypted multicast traffic with a local key to produce local encrypted multicast traffic, the local key being available to the given multicast domain, and forwards the local encrypted multicast traffic to one or more network devices in the given multicast domain. In a further embodiment of the invention, the apparatus and method of implementing multicast security in a network first receives at the given multicast domain a global key message that identifies the global key.

In an alternate embodiment of the invention, the local encrypted multicast traffic is forwarded to all of the network devices in the given multicast domain. In a further alternate embodiment of the invention, the local encrypted multicast traffic is forwarded to a subset of the network devices in the given multicast domain, the subset of network devices being identified in a multicast message. In a still further alternate embodiment of the invention, the local key is only available to the given multicast domain.

In accordance with a still further aspect of the invention, a method of implementing multicast security in a given multicast domain receives multicast traffic, constructs, in response to the received multicast traffic, an information message that alerts other multicast domains of the security capabilities of the given multicast domain, and forwards the information message to at least one other multicast domain. In a further embodiment of the invention, the information message is a part of a multicast protocol message. In a still further embodiment of the invention, one or more bits in one or more fields of the multicast protocol message are set to alert other multicast domains of the security capabilities of the given multicast domain.

In other embodiments of the invention, the given multicast domain is a protocol independent multicast domain or, in the alternative, the given multicast domain is a group of contiguous protocol independent multicast domains. In a still other embodiment of the invention, the given multicast domain is part of a Multicast Source Discovery Protocol backbone.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE INVENTION

In accordance with an embodiment of the invention, multicast security between multicast domains, particularly Protocol Independent Multicast-Sparse Mode ("PIM-SM") domains, is implemented through a Multicast Source Discovery Protocol ("MSDP") bridge. A multicast protocol, such as Distance Vector Multicast Routing Protocol ("DVMRP"), runs over the MSDP bridge to forward secure multicast traffic in the global key space. A security broker in each interested multicast domain translates the multicast traffic from the MSDP bridge to the local domain and forwards the multicast traffic in the local key space.

Figure 1:
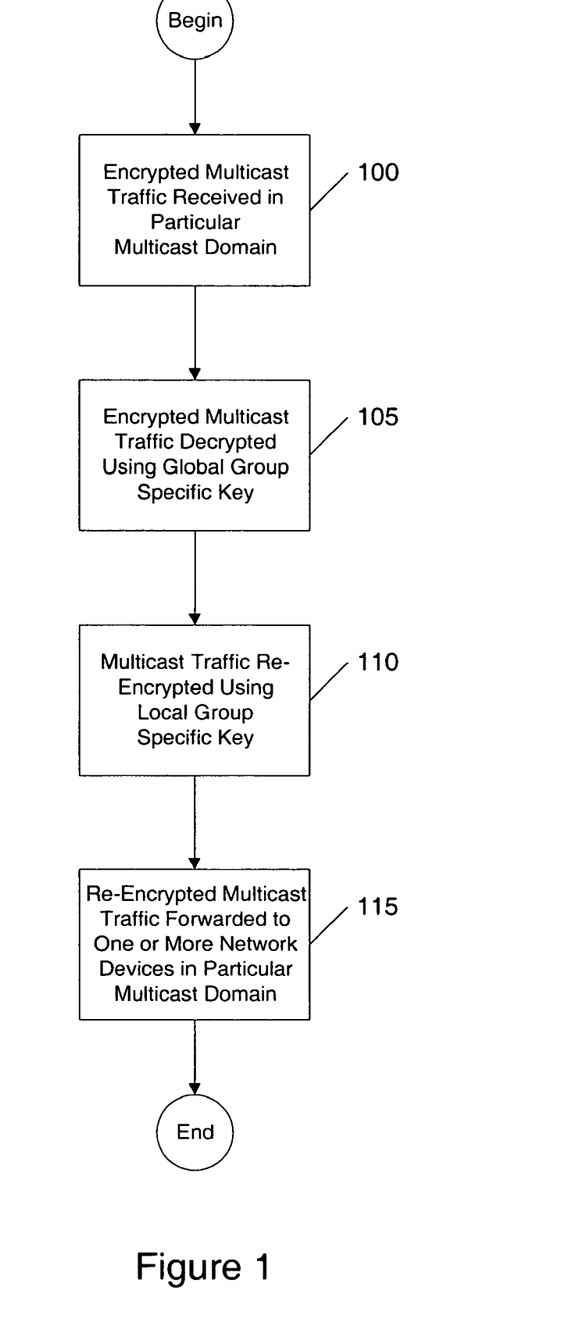
FIG. 1 shows an exemplary process for implementing the invention in a particular multicast domain.

FIG. 1 shows an exemplary process for implementing various embodiments of the invention in a particular multicast domain. The process begins at step 100, in which encrypted multicast traffic for a multicast group is received in a particular multicast domain. The multicast traffic has been previously encrypted with a symmetrical encryption key that is available to the multicast domain. The key is also available to one or more other multicast domains. Thus, for reference purposes, the key is referred to as a "global group specific key." The process continues at step 105, in which the encrypted multicast traffic is decrypted with the global group specific key. At step 110, the multicast traffic is re-encrypted. At this step, the multicast traffic is encrypted using a local group specific key, i.e., a key available to the particular multicast domain, but not necessarily available to other multicast domains. In alternate embodiments, the local group specific key may only be available to the particular multicast domain. At step 115, the re-encrypted multicast traffic is forwarded to one or more network devices in the particular multicast domain. Ultimately, the network devices forward the multicast traffic to the receivers (or users) of the multicast (not shown). The receivers (or users) of a multicast are referred to as "members" of a multicast. Members of a multicast who have acquired a local group specific key for the multicast in their multicast domain are referred to as secure members.

In another embodiment of the invention, the re-encrypted multicast traffic is forwarded to all of the network devices in the particular multicast domain (not shown). In the alternative, the re-encrypted multicast traffic is forwarded to a subset of the network devices in the particular multicast domain (not shown).

Figure 2:
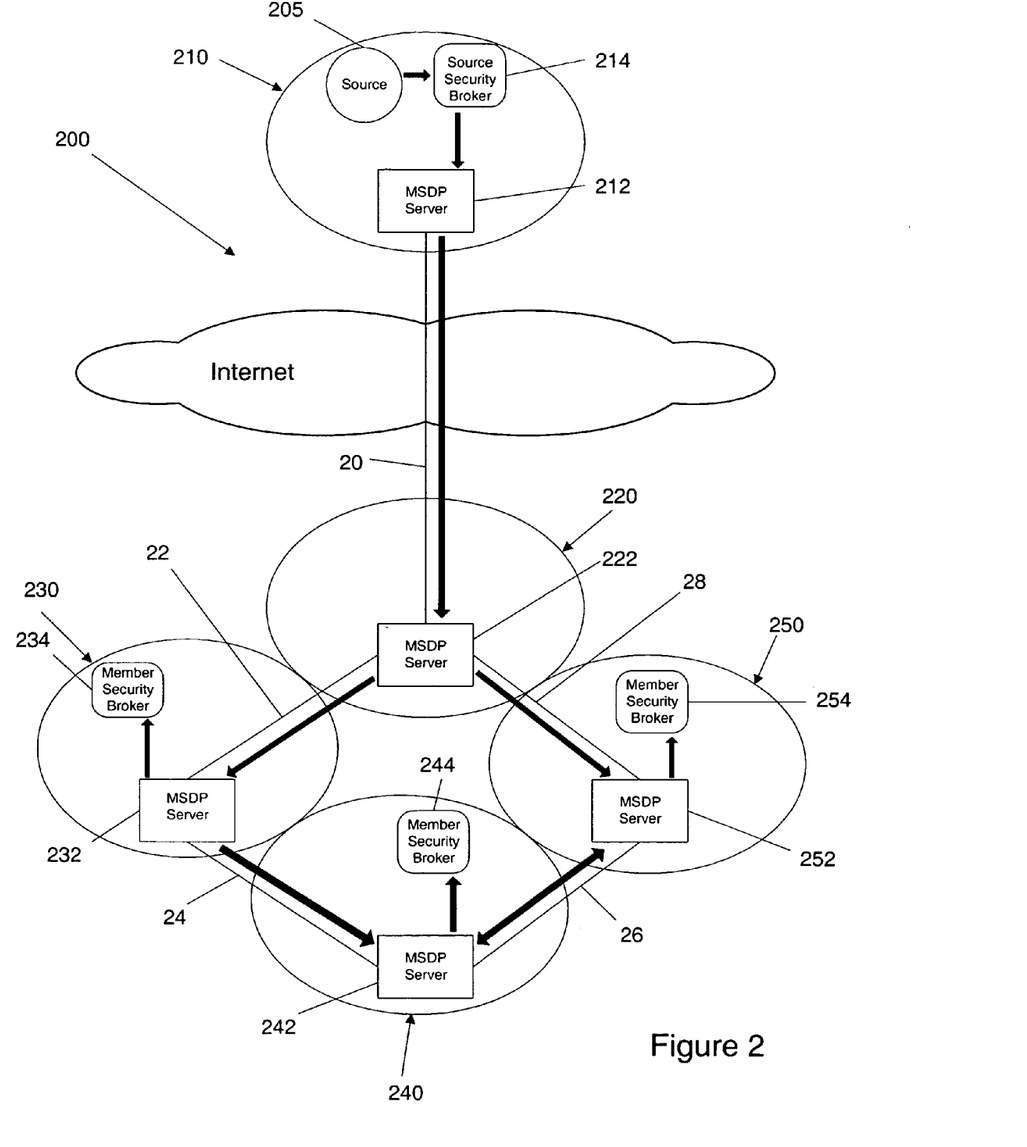
FIG. 2 schematically shows an exemplary Multicast Source Discovery Protocol ("MSDP") backbone, in which various embodiments of the invention may be implemented.

FIG. 2 schematically shows an exemplary MSDP backbone, MSDP backbone 200, in which various embodiments of the invention may be implemented. MSDP backbone 200 includes five multicast domains—domain 210, domain 220, domain 230, domain 240 and domain 250. Domain 210 is a remote Protocol Independent Multicast ("PIM") domain. It includes MSDP Server 212, source security broker 214, and source 205. MSDP Server 212 is a network device configured to receive multicast messages sent to domain 210. For example, MSDP Server 212 may be configured to receive all multicast messages sent to domain 210. Source security broker 214 is a network device responsible for multicasts in a particular range of multicast addresses, referred to as the Rendezvous Point ("RP") for the particular multicasts. In remote domain 210, source security broker 214 is the RP for the multicast being sent from source 205.

Domains 220, 230, 240, and 250 are local PIM domains. Domain 220 includes MSDP Server 222. Domain 230 includes MSDP Server 232 and member security broker 234. Domain 240 includes MSDP Server 242 and member security broker 244. Domain 250 includes MSDP Server 252 and member security broker 254. Similar to source security broker 214, the member security brokers are the RPs in their respective multicast domains for the multicast being sent from source 205. For example, member security broker 234 is the RP in local domain 230 for the multicast being sent from source 205.

Connectors 20, 22, 24, 26, and 28 show the peering relationship between the MSDP Servers. For example, MSDP Server 212 in remote domain 210 peers, in an external peering relationship, with MSDP Server 222 in local domain 220. An external peering relationship occurs between MSDP Servers in neighboring PIM domains or, if the neighboring PIM domain does not contain a MSDP Server, between the MSDP Server and a RP in the neighboring domain. In one embodiment, TCP connections are set up and GRE tunnels are configured over connectors 20, 22, 24, 26, and 28.

In contrast, the member security brokers in the local domains peer with their respective MSDP Servers in an internal peering relationship in the multicast domain. An internal peering relationship occurs between a MSDP Server in the multicast domain and the network device in the multicast domain responsible for particular multicasts, i.e., the RPs. For example, MSDP Server 242 in local domain 240 peers internally with member security broker 244.

In MSDP backbone 200, security brokers 214, 234, 244, and 254 are the RPs in their respective multicast domains for the multicast being sent from source 205.

In an alternate embodiment, MSDP backbone 200 may also include a group (or groups) of contiguous PIM domains (not shown). In this configuration, the security broker for the group of contiguous PIM domains (whether a source security broker or member security broker) is the root of the shared tree for the group.

Figure 3A:
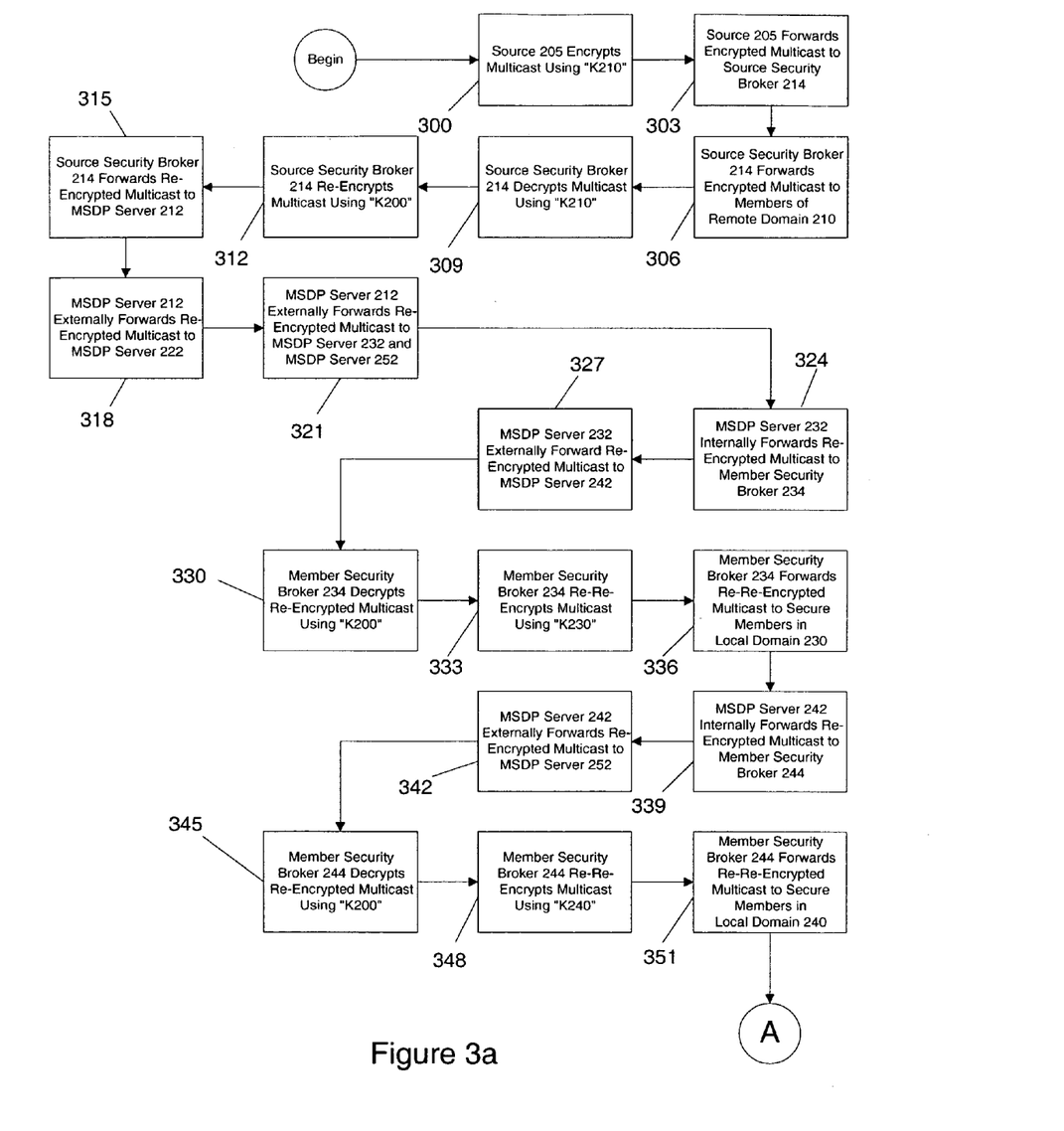
FIG. 3 shows an exemplary process for implementing the invention between multicast domains in the exemplary MSDP backbone shown in FIG. 2.
Figure 3B:
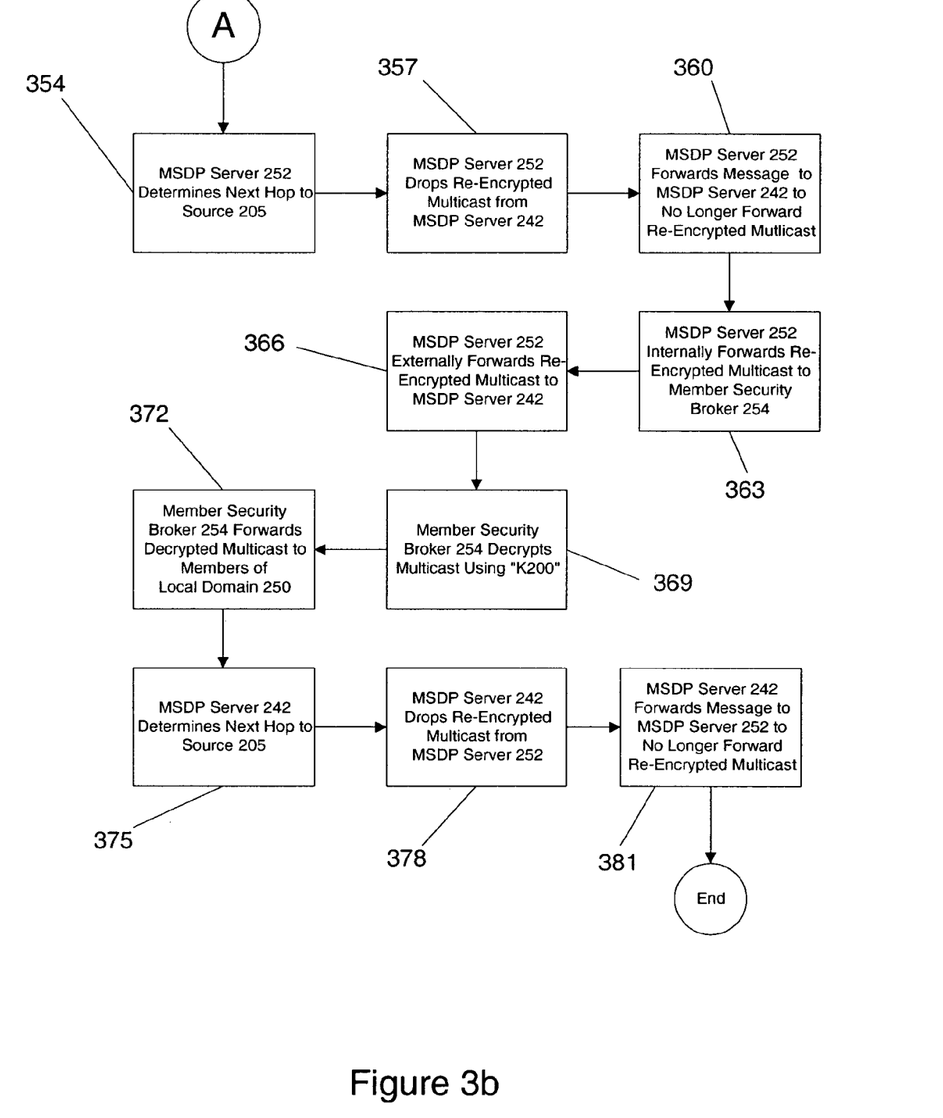

FIGS. 3a–3b show an exemplary process for implementing various embodiments of the invention between multicast domains in MSDP backbone 200. The process begins at step 300, in which source 205 encrypts the multicast traffic using a local group specific key for the multicast for remote domain 210 (referred to as "K210"). The process continues at step 303, in which source 205 forwards the encrypted multicast traffic to source security broker 214. At step 306, source security broker 214 forwards the encrypted multicast traffic to the secure members in remote domain 210. As discussed below in reference to FIG. 7 (step 735), secure members of the multicast in remote domain 210 have previously received "K210" (the local group specific key for the multicast for remote domain 210) from source security broker 214. Thus, because source 205 encrypted the multicast traffic using "K210", source security broker 214 can forward the encrypted multicast traffic to the secure members in remote domain 210 without the need for security translation.

The process continues at step 309, in which source security broker 214 decrypts the encrypted multicast traffic using "K210" (the local group specific key for the multicast for remote domain 210) and, at step 312, re-encrypts the decrypted multicast traffic using a global group specific key for the multicast being sent from source 205 (referred to as "K200"). At step 315, source security broker 214 forwards the re-encrypted multicast traffic to MSDP Server 212 in remote domain 210.

MSDP Server 212, at step 318, externally forwards the re-encrypted multicast traffic to MSDP Server 222 in local domain 220 through a GRE tunnel configured over connector 160. At step 321, MSDP Server 222 externally forwards the re-encrypted multicast traffic to MSDP Server 232 in local domain 230 over connector 162 and to MSDP Server 252 in local domain 250 over connector 168. MSDP Server 222 in local domain 220 does not internally forward the re-encrypted multicast traffic because local domain 220 does not contain a member security broker.

The process now continues at local domain 230. At step 324, MSDP Server 232 in local domain 230 internally forwards the re-encrypted multicast traffic to member security broker 234 and, at step 327, externally forwards the re-encrypted multicast traffic to MSDP Server 242 in local domain 240 via connector 164. Member security broker 234, at step 330, decrypts the re-encrypted multicast traffic using "K200" (the global group specific key for the multicast being sent from source 205) and, at step 333, re-re-encrypts the multicast traffic using a local group specific key for the multicast for local domain 230 (referred to as "K230"). At step 336, member security broker 234 forwards the re-re-encrypted multicast traffic to secure members in local domain 230. As discussed below in reference to FIG. 7 (step 740), secure members of the multicast in local domain 230 have previously received "K230" from member security broker 234.

The process now continues at local domain 240. At step 339, MSDP Server 242 internally forwards the re-encrypted multicast traffic to member security broker 244 and, at step 342, externally forwards the re-encrypted multicast traffic to MSDP Server 252 in local domain 250 via connector 166. Member security broker 244, at step 345, decrypts the re-encrypted multicast traffic using "K200" (the global group specific key for the multicast being sent from source 205) and, at step 348, re-re-encrypts the multicast traffic using a local group specific key for the multicast for local domain 240 (referred to as "K240"). At step 351, member security broker 244 forwards the re-re-encrypted multicast traffic to secure members in local domain 240. As discussed below in reference to FIG. 7 (step 745), secure members of the multicast in local domain 240 have previously received "K240" from member security broker 244.

The process now continues at local domain 250. As discussed at steps 321 and 342 above, MSDP Server 252 has received the re-encrypted multicast traffic from both MSDP Server 222 in local domain 220 (step 321) and MSDP Server 242 in local domain 240 (step 342). Thus, at step 354, MSDP Server 252 first determines that the next hop to source 205 is MSDP Server 222 in local domain 220. Accordingly, at step 357, MSDP Server 252 drops the re-encrypted multicast traffic from MSDP Server 242 in local domain 240 and, at step 360, forwards a message to MSDP Server 242 to no longer forward the re-encrypted multicast traffic to it. MSDP Server 252 then, at step 363, internally forwards the re-encrypted multicast traffic to member security broker 254 and, at step 366, externally forwards the re-encrypted multicast traffic to MSDP Server 242 in local domain 240. At step 369, member security broker 254 decrypts the re-encrypted multicast traffic using "K200" (the global group specific key for the multicast being sent from source 205) and, at step 372, forwards the decrypted multicast traffic to members in local domain 250.

The process now moves back to local domain 240. As discussed above at steps 327 and 365, MSDP Server 242 has received the re-encrypted multicast traffic from both MSDP Server 232 in local domain 230 (step 327) and MSDP Server 252 in local domain 250 (step 365). Thus, at step 375, MSDP Server 242 determines that the next hop to source 205 is MSDP Server 232. Accordingly, at step 378, MSDP Server 242 drops the re-encrypted multicast traffic from MSDP Server 252 in local domain 250 and, at step 381, forwards a message to MSDP Server 252 to no longer forward the re-encrypted multicast traffic to it.

In other embodiments of the invention, the process for implementing multicast security between multicast domains is executed in accordance with a multicast protocol. At present, DVMRP is one of the various multicast protocols to run because DVMRP has its own routing. With Multicast Broader Gateway Protocol ("MBGP") routing in place, Border Gateway Multicast Protocol ("BGMP") is another multicast protocol to run. In addition, the MSDP backbone may be partitioned into numerous multicast routing domains, each running a different multicast protocol.

Figure 4:
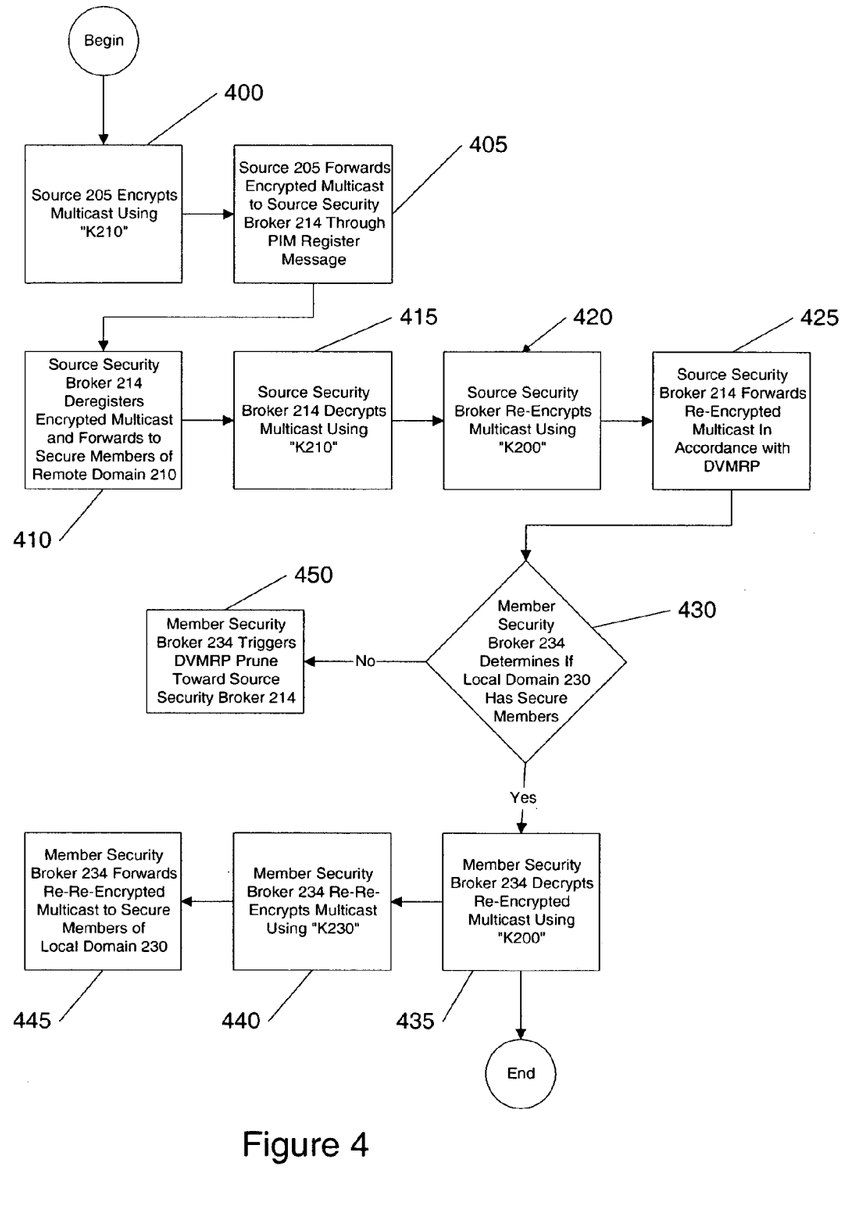
FIG. 4 shows an exemplary process for implementing the invention between multicast domains in the exemplary MSDP backbone shown in FIG. 2 using DVMRP for support.

FIG. 4 shows an exemplary process for implementing various embodiments of the invention between multicast domains in MSDP backbone 200 using DVMRP for support. The process begins at step 400, in which source 205 encrypts the multicast traffic using "K210" (the local group specific key for the multicast for remote domain 210). The process continues at step 405, in which source 205 forwards the encrypted multicast traffic to source security broker 214 through a PIM Register message. At step 410, source security broker 214 deregisters the encrypted multicast traffic and forwards it to the secure members in remote domain 210 without security translation. As discussed below in reference to FIG. 7 (step 735), secure members of the multicast in remote domain 210 have previously received "K210" (the local group specific key for the multicast for remote domain 210) from source security broker 214. Thus, because source 205 encrypted the multicast traffic using "K210", source security broker 214 can forward the encrypted multicast traffic to the secure members in remote domain 210 without the need for security translation.

At step 415, source security broker 214 decrypts the encrypted multicast traffic using "K210" (the local group specific key for the multicast for remote domain 210) and, at step 420, re-encrypts the multicast traffic using "K200" (the global group specific key for the multicast being sent from source 205). Source security broker 214 then forwards, at step 425, the re-encrypted multicast traffic over MSDP backbone 200 in accordance with DVMRP.

The process now continues at, for example, local domain 230. At step 430, member security broker 234 first determines whether local domain 230 contains any secure members for the multicast being sent from source 205. In other words, member security broker 234 determines whether any members in local domain 230 have acquired "K230" (the local group specific key for the multicast for local domain 230). If yes, then member security broker 234, at step 435, decrypts the re-encrypted multicast traffic using "K200" (the global group specific key for the multicast being sent from source 205) and, at step 440, re-re-encrypts the multicast traffic using "K230" (the local group specific key for the multicast for the local domain 230). At step 445, member security broker 234 forwards the re-re-encrypted multicast traffic to the secure members in local domain 230. If no, then member security broker 234, at step 450, triggers a DVMRP prune towards source security broker 214 over MSDP backbone 200.

If, at a later time, some domain members acquire the local group specific key for the domain (in other words, become secure members), then the security broker for the domain will trigger a DVMRP graft message toward the source security broker. For example, at step 450, member security broker 234 has determined that none of the members in local domain 230 are secure members. Accordingly, member security broker 234 has sent a DVMRP prune message towards source security broker 214 over MSDP backbone 200. Presently, member security broker 234 determines that one or more of the members in local domain 230 have now acquired "K230" (the local group specific key for the multicast for local domain 230), i.e., have become secure members (not shown). Accordingly, member security broker 234 sends a DVMRP graft message toward source security broker 214 (not shown). Source security broker 214 will, once again, forward re-encrypted multicast traffic toward member security broker 234 over MSDP backbone 200 (not shown).

Figure 5:
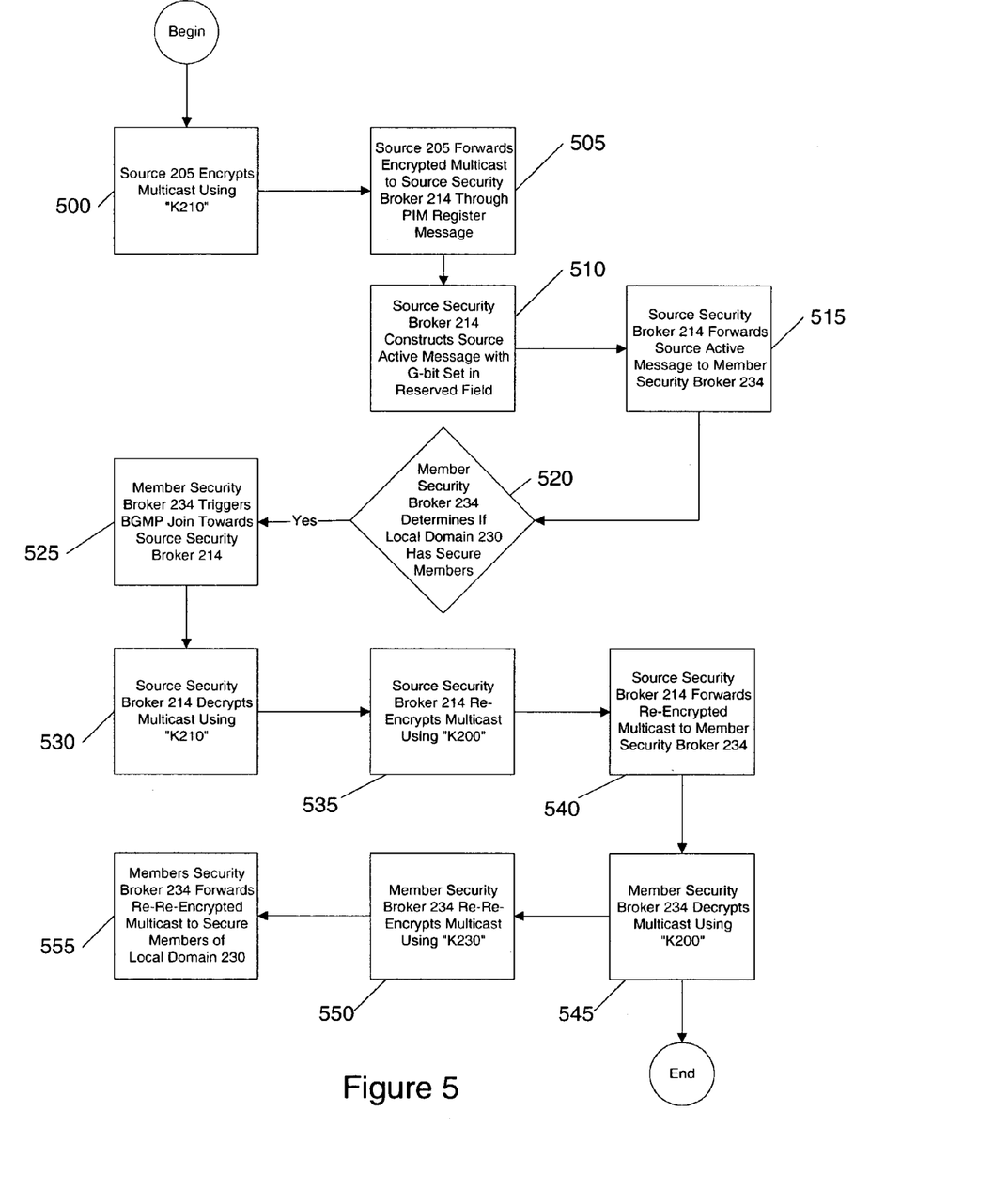
FIG. 5 shows an exemplary process for implementing the invention between multicast domains in the exemplary MSDP backbone shown in FIG. 2 using BGMP for support.

FIG. 5 shows an exemplary process for implementing various embodiments of the invention between multicast domains in MSDP backbone 200 using BGMP for support. The process begins at step 500, in which source 205 encrypts the multicast traffic using "K210" (the local group specific key for the multicast for remote domain 210). The process continues at step 505, in which source 205 forwards the encrypted multicast traffic to source security broker 214 through a PIM Register message. At step 510, source security broker 214 constructs a Source Active ("SA") message with a G-bit set in the reserved field and, at step 515, forwards the SA message to, for example, member security broker 234 in local domain 230.

The process now continues at local domain 230. At step 520, member security broker 234 first determines whether any of the members in local domain 230 are interested in the multicast being sent from source 205. If yes, at step 525, member security broker 234 triggers a BGMP join towards source security broker 214. (The coding for the BGMP join is (SSB214, G).)

The process now moves back to remote domain 210. At step 530, source security broker 214 decrypts the encrypted multicast traffic using "K210" (the local group specific key for the multicast for the remote domain 210) and, at step 535, re-encrypts the multicast traffic using "K200" (the global group specific key for the multicast being sent from source 205). At step 540, source security broker 214 forwards the re-encrypted multicast traffic to member security broker 234 in local domain 230.

The process now continues at local domain 230. At step 545, member security broker 234 decrypts the re-encrypted multicast traffic using "K200" (the global group specific key for the multicast being sent from source 205) and, at step 550, re-re-encrypts the multicast traffic using "K230" (the local group specific key for the multicast for local domain 230). At step 555, member security broker 234 forwards the re-re-encrypted multicast traffic to the secure members in local domain 230.

The BGMP join messages set up a branch of a source tree to the respective domain through the MSDP backbone. For example, the BGMP join (SSB214, G) message sent from member security broker 234 towards source security broker 214 set ups a branch of the source tree for local domain 230.

Figure 6:
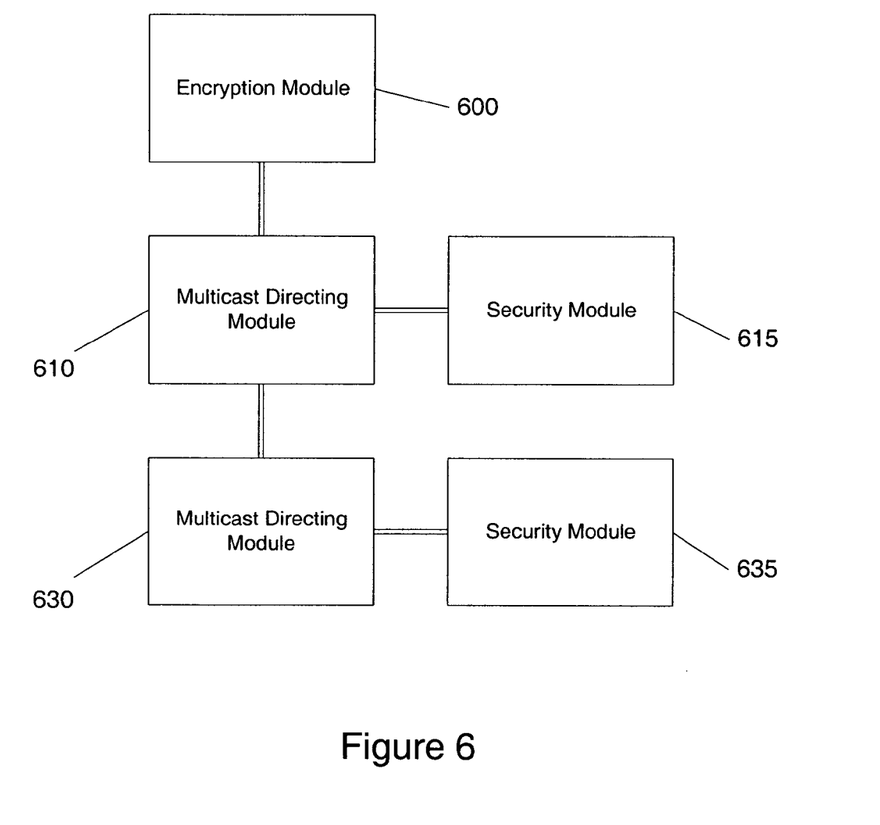
FIG. 6 shows a block diagram of an exemplary apparatus for implementing the invention between multicast domains in the exemplary MSDP backbone shown in FIG. 2.

FIG. 6 is a block diagram of an exemplary apparatus for implementing various embodiments of the invention between multicast domains in MSDP backbone 200. The apparatus includes encryption module 600 and multicast directing module 610 in, for example, remote domain 210. In this exemplary embodiment of the invention, encryption module 600 encrypts multicast traffic using "K210" (the local group specific key for the multicast for remote domain 210). Multicast directing module 610 forwards the encrypted multicast traffic to source security broker 214. It also forwards the encrypted multicast traffic to the secure members in remote domain 210, as well as to security module 615. Security module 615 decrypts the encrypted multicast traffic using "K210" (the local group specific key for the multicast for remote domain 210) and re-encrypts it using "K200" (the global group specific key for the multicast being sent from source 205). Multicast directing module 610 then forwards the re-encrypted multicast traffic over MSDP backbone 200 to, for example, multicast directing module 630 in local domain 230.

The apparatus further includes multicast directing module 630 and security module 635 in, for example, local domain 230. In this exemplary embodiment of the invention, multicast directing module 630 forwards the re-encrypted multicast traffic to security module 635. Security module 635 decrypts the re-encrypted multicast traffic using "K200" (the global group specific key for the multicast being sent from source 205) and re-re-encrypts the multicast traffic using "K230" (the local group specific key for the multicast for local domain 230). Multicast directing module 630 then forwards the re-re-encrypted multicast traffic to the secure members in local domain 230.

Figure 7:
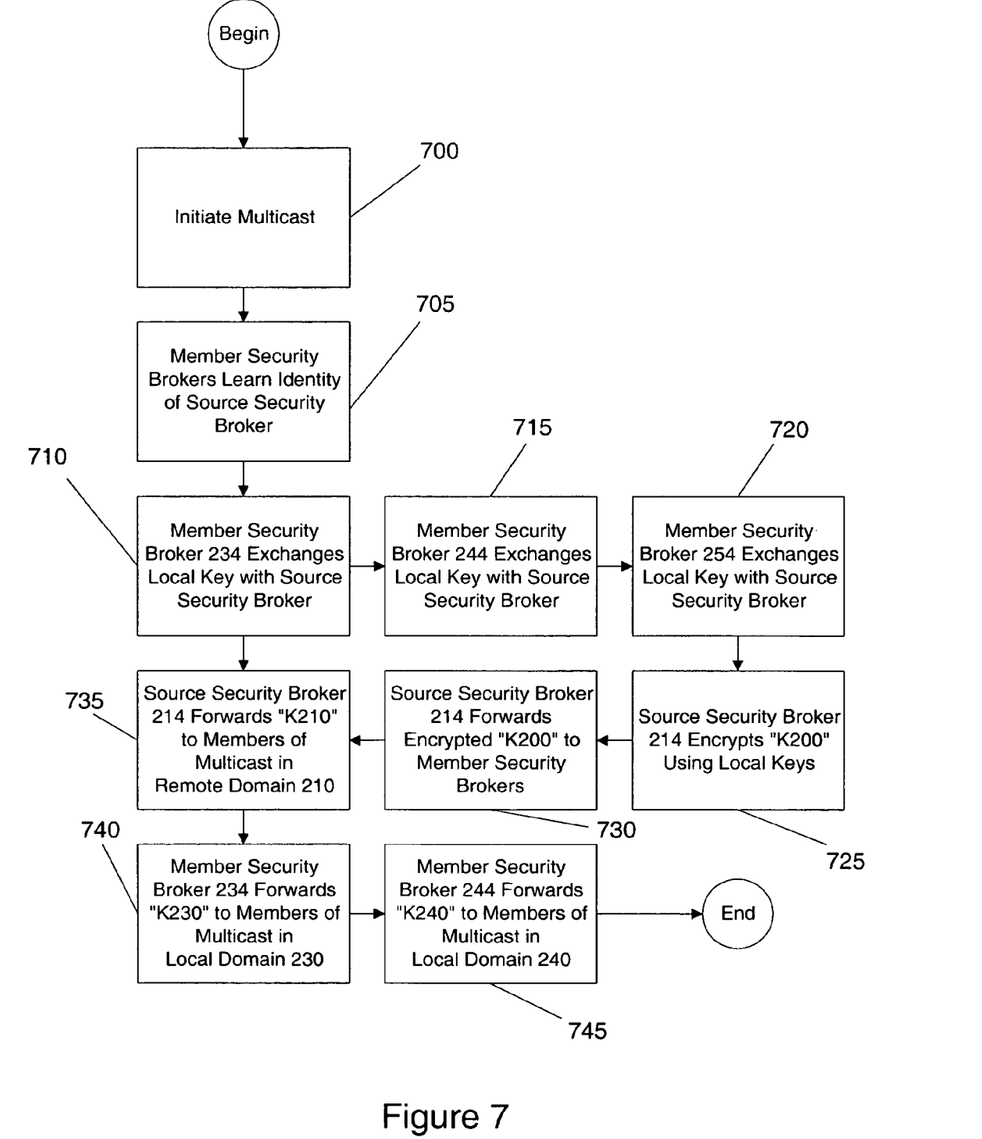
FIG. 7 shows an exemplary process for initial key distribution of a global group specific key and local group specific keys for a particular multicast.

FIG. 7 shows an exemplary process for initial key distribution of a global group specific key and local group specific keys for the multicast being sent from source 205. The process begins at step 700, in which a multicast is initiated at source 205. At step 705, the member security brokers in the local domains learn the identity of source security broker 214 through procedures familiar to those skilled in the art. In turn, at step 710, member security broker 234 in local domain 230 exchanges its local group specific key for the multicast (shown as "K230") with source security broker 214 through Internet Key Exchange ("IKE") protocol. Similarly, at steps 715 and 720, member security broker 244 in local domain 240 and member security broker 254 in local domain 250 exchange their local group specific keys for the multicast (shown as "K240" and "K250" respectively) with source security broker 214 through IKE protocol.

The process then continues at step 725, in which source security broker 214 encrypts the global group specific key for the multicast being sent from source 205 (shown as "K200") using, respectively, each member security brokers' local group specific key. It then forwards, respectively, at step 730, the encrypted global group specific key to the member security brokers in the local domains. At step 735, source security broker 214 forwards the local group specific key for the multicast (shown as "K210") for remote domain 210 to source 205 and to receivers of the multicast in remote domain 210.

The member security brokers now continue the process of key distribution, as shown at steps 740 and 745. At step 740, member security broker 234 forwards "K230" (the local group specific key for the multicast for local domain 230) to members of the multicast in local domain 230. At step 745, member security broker 244 forwards "K240" (the local group specific key for the multicast for local domain 240) to members of the multicast in local domain 240. Because member security broker 254 forwards native data to members of the multicast in local domain 250, member security broker 254 does not need to forward a local group specific key to members of the multicast in local domain 250.

When multicast traffic is forwarded in accordance with the invention, it is referred to as being forwarded in MSDP bridge mode. In MSDP bridge mode, the PIM domains are separated without (S,G) joins in between. In addition, the multicast traffic is forwarded down a shared tree. In contrast, in native mode, the PIM domains learn of a multicast source through MSDP protocol, trigger (S,G) joins towards the source domain, and forward multicast traffic down the shortest path tree across the PIM domains.

A security broker explicitly informs other PIM-SM domains of its security broker configuration, i.e., decryption/encryption capabilities, through the MSDP bridge. In one embodiment, the security broker indicates its decryption/encryption capabilities through the use of a SA message. In particular, the security broker sets a G-bit in the reserved field of the SA message. However, because a SA message is used to indicate a secure group for all sources, when a security broker utilizes a SA message to explicitly inform other PIM-SM domains of its security broker configuration, the Sprefix Len and Source Address Prefix of the SA message is set to zero. The format is shown below:

When the SA message is received on a PIM-SM domain from the MSDP bridge, the security broker responsible for the secure multicast group correspondingly sets a G-bit in the reserved field of the encoded group address as follows:

The encoded group address is transmitted in the periodic Candidate-Rendezvous Point ("C-RP") advertisement. In turn, the bootstrap router carries the G-bit for the secure multicast group in each Bootstrap message. In this manner, all routers in the domain learn the identity of the security broker and the forwarding mode for a particular multicast group, and only join the shared tree.

For a particular multicast group, it is important that communication stay either constantly in MSDP bridge mode or constantly in native mode. There are two primary reasons for the need to maintain communications in either one or the other mode exclusively. First, the MSDP bridge is in a distinct secure key space from the PIM domains. Second, PIM domains on the shortest path tree will receive duplicate multicast traffic.

In order to enforce this behavior, each PIM router, when determining the G-bit is set for the security broker for a particular multicast group, should not trigger a (S,G) join. If the PIM router receives a (S,G) join from downstream, it should stop propagating the (S,G) join upstream towards the source. If there is already a (S,G) state in the PIM router for the particular group, the router should trigger a (*,G) join towards the relevant security broker. Or, the PIM router can remove the (S,G) prune. When multicast traffic arrives from the shared tree, the PIN router should trigger an (S,G) prune towards the S across the PIM domain.

The various embodiments of the invention may be implemented in any conventional computer programming language. For example, the various embodiments may be implemented in a procedural programming language (for example, "C") or an object-oriented programming language (for example, "C++"). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

Although various embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of implementing multicast security in a given multicast domain, the method comprising:
   receiving multicast traffic that is encrypted with a global key, the global key being available to the given multicast domain and one or more other multicast domains;
   decrypting the received multicast traffic with the global key to produce decrypted multicast traffic;
   encrypting the decrypted multicast traffic with a local key to produce local encrypted multicast traffic, the local key being available only to network devices in the given multicast domain, wherein the multicast domain includes a plurality of network devices, and wherein the multicast traffic includes a plurality of multicast messages; and
   forwarding the local encrypted multicast traffic to the plurality of network devices in the given multicast domain.

2. The method according to claim 1, further comprising:
   receiving a global key message that identifies the global key.

3. The method according to claim 1 wherein the local encrypted multicast traffic is forwarded to all of the network devices in the given multicast domain.

4. The method according to claim 1 wherein the local encrypted multicast traffic is forwarded to a subset of the network devices in the given multicast domain, the subset of network devices being identified in a multicast message.

5. The method according to claim 1 wherein the given multicast domain is a protocol independent multicast domain.

6. The method according to claim 1 wherein the given multicast domain is a group of contiguous protocol independent multicast domains.

7. The method according to claim 1 wherein the given multicast domain is part of a Multicast Source Discovery Protocol backbone.

8. The method according to claim 1, further comprising:
   determining whether the given multicast domain contains no network devices interested in the received multicast traffic;
   in the event that the given multicast domain contains no network devices interested in the received multicast traffic, sending a terminate message to no longer forward the received multicast traffic to the given multicast domain.

9. The method according to claim 8, further comprising:
   receiving a global key message that identifies the global key.

10. The method according to claim 8, further comprising:
    determining, after having sent the terminate message, that the given multicast domain contains one or more network devices interested in the received multicast traffic; and
    sending a resume message to once again forward the received multicast traffic to the given multicast domain.

11. The method according to claim 8 wherein the given multicast domain is a protocol independent multicast domain.

12. The method according to claim 8 wherein the given multicast domain is a group of contiguous protocol independent multicast domains.

13. The method according to claim 8 wherein the given multicast domain is part of a Multicast Source Discovery Protocol backbone.

14. A method of implementing multicast security in a network, the method comprising:
    encrypting multicast traffic with a global key, the global key being available to a given multicast domain and one or more other multicast domains;
    forwarding the global encrypted multicast traffic to the given multicast domain;
    receiving the global encrypted multicast traffic at the given multicast domain;
    decrypting, at the given multicast domain, the global encrypted multicast traffic with the global key to produce decrypted multicast traffic;
    encrypting, at the given multicast domain, the decrypted multicast traffic with a local key to produce local encrypted multicast traffic, the local key being available only to network devices in the given multicast domain, wherein the multicast domain includes a plurality of network devices, and wherein the multicast traffic includes a plurality of multicast messages; and
    forwarding the local encrypted multicast traffic to the plurality of network devices in the given multicast domain.

15. The method according to claim 14, further comprising:
    receiving at the given multicast domain a global key message that identifies the global key.

16. The method according to claim 14 wherein the local encrypted multicast traffic is forwarded to all of the network devices in the given multicast domain.

17. The method according to claim 14 wherein the local encrypted multicast traffic is forwarded to a subset of the network devices in the given multicast domain, the subset of network devices being identified in a multicast message.

18. The method according to claim 14 wherein the given multicast domain is a protocol independent multicast domain.

19. The method according to claim 14 wherein the given multicast domain is a group of contiguous protocol independent multicast domains.

20. The method according to claim 14 wherein the given multicast domain is part of a Multicast Source Discovery Protocol backbone.

21. The method according to claim 14, further comprising:
constructing, in response to the received multicast traffic, an information message that alerts other multicast domains of the security capabilities of the given multicast domain; and
forwarding the information message to at least one other multicast domain.

22. The method according to claim 21 wherein the information message is a part of a multicast protocol message.

23. The method according to claim 22 wherein one or more bits in one or more fields of the multicast protocol message are set to alert other multicast domains of the security capabilities of the given multicast domain.

24. An apparatus for implementing multicast security in a given multicast domain, the apparatus comprising:
a receiver for receiving multicast traffic that is encrypted with a global key, the global key being available to the given multicast domain and one or more other multicast domains;
a decryptor for decrypting the received multicast traffic with the global key to produce decrypted multicast traffic;
an encryptor for encrypting the decrypted multicast traffic with a local key to produce local encrypted multicast traffic, the local key being available only to network devices in the given multicast domain, wherein the multicast domain includes a plurality of network devices, and wherein the multicast traffic includes a plurality of multicast messages; and
a traffic forwarder for forwarding the local encrypted multicast traffic to the plurality of network devices in the given multicast domain.

25. The apparatus according to claim 24, further comprising:
a second receiver for receiving a global key message that identifies the global key.

26. The apparatus according to claim 24 wherein the local encrypted multicast traffic is forwarded to all of the network devices in the given multicast domain.

27. The apparatus according to claim 24 wherein the local encrypted multicast traffic is forwarded to a subset of the network devices in the given multicast domain, the subset of network devices being identified in a multicast message.

28. The apparatus according to claim 24 wherein the given multicast domain is a protocol independent multicast domain.

29. The apparatus according to claim 24 wherein the given multicast domain is a group of contiguous protocol independent multicast domains.

30. The method according to claim 24 wherein the given multicast domain is part of a Multicast Source Discovery Protocol backbone.

31. A computer program product for implementing multicast security in a given multicast domain, the computer program product comprising a computer usable medium having computer readable program code thereon, the computer program code including:
program code for receiving multicast traffic that is encrypted with a global key, the global key being available to the given multicast domain and one or more other multicast domains;
program code for decrypting the received multicast traffic with the global key to produce decrypted multicast traffic;
program code for encrypting the decrypted multicast traffic with a local key to produce local encrypted multicast traffic, the local key being available only to network devices in the given multicast domain, wherein the multicast domain includes a plurality of network devices, and wherein the multicast traffic includes a plurality of multicast messages; and
program code for forwarding the local encrypted multicast traffic to the plurality of network devices in the given multicast domain.

32. The computer program product according to claim 31, further comprising:
program code for receiving a message that identifies the global key.

33. The computer program code to claim 31 wherein the local encrypted multicast traffic is forwarded to all of the network devices in the given multicast domain.

34. The computer program code according to claim 31 wherein the local encrypted multicast traffic is forwarded to a subset of the network devices in the given multicast domain, the subset of network devices being identified in a multicast message.

35. The computer program code according to claim 31 wherein the given multicast domain is a protocol independent multicast domain.

36. The computer program code according to claim 31 wherein the given multicast domain is a group of contiguous protocol independent multicast domains.

37. The method according to claim 31 wherein the given multicast domain is part of a Multicast Source Discovery Protocol backbone.

38. An apparatus for implementing multicast security in a network, the apparatus comprising:
means for encrypting multicast traffic with a global key, the global key being available to a given multicast domain and one or more other multicast domains;
means for forwarding the global encrypted multicast traffic to the given multicast domain;
means for receiving the global encrypted multicast traffic at the given multicast domain;
means for decrypting, at the given multicast domain, the global encrypted multicast traffic with the global key to produce decrypted multicast traffic;
means for encrypting, at the given multicast domain, the decrypted multicast traffic with a local key to produce local encrypted multicast traffic, the local key being available only to network devices in the given multicast domain, wherein the multicast domain includes a plurality of network devices, and wherein the multicast traffic includes a multicast messages; and means for forwarding the local encrypted multicast traffic to the plurality of network devices in the given multicast domain.

39. The apparatus according to claim 38, further comprising:
means for receiving at the given multicast domain a global key message that identifies the global key.

40. The apparatus according to claim 38 wherein the local encrypted multicast traffic is forwarded to all of the network devices in the given multicast domain.

41. The apparatus according to claim 38 wherein the local encrypted multicast traffic is forwarded to a subset of the network devices in the given multicast domain, the subset of network devices being identified in a multicast message.

42. The apparatus according to claim 38 wherein the given multicast domain is a protocol independent multicast domain.

43. The apparatus according to claim 38 wherein the given multicast domain is a group of contiguous protocol independent multicast domains.

44. The method according to claim 38 wherein the given multicast domain is part of a Multicast Source Discovery Protocol backbone.

* * * * *